Jan. 8, 1929.

D. J. LUCKETT 1,697,874

ENDLESS TRACK FOR TRACK LAYING VEHICLES

Filed Feb. 19, 1925

Inventor
D. J. Luckett
By
Attorney

Patented Jan. 8, 1929.

1,697,874

UNITED STATES PATENT OFFICE.

DINWIDDIE J. LUCKETT, OF DAVENPORT, IOWA.

ENDLESS TRACK FOR TRACK-LAYING VEHICLES.

Application filed February 19, 1925. Serial No. 10,339.

(GRANTED UNDER THE ACT OF MARCH 3, 1883, AS AMENDED APRIL 30, 1928; 370 O. G. 757.)

The invention described herein may be manufactured and used by or for the Government for governmental purposes without the payment to me of any royalty thereon.

The subject of this invention is an endless track for track laying vehicles.

In universally connected endless tracks having a tubular trackway, as desclosed in Patent #1,440,243, the cylindrical bearing block mounted in each link for carrying the connecting bolt is subject to become detached or unthreaded on flexing of the track or undue rotation of the adjacent link. When the cylindrical block is integral with or permanently secured to the link it is necessary to so construct the link as to gain access to the nut on the bolt for assembling or disassembling the track, while the threaded type of block must be formed with an external portion and it is also necessary to provide a clamp for holding the block against unthreading.

The principal objects of the present invention are: to provide means for performing the dual function of driving lug and retainer for the block; to provide means whereby the joints will be under a constant pressure of lubricant so as to prevent incursion of foreign substances; and to permit adjustment of the connecting bolt to allow for wear of the joints.

To these and other ends, my invention consists in the construction, arrangement, and combination of elements, described hereinafter and pointed out in the claims forming a part of this specification.

A practical embodiment of my invention is illustrated in the accompanying drawing, wherein.

Figure 1:
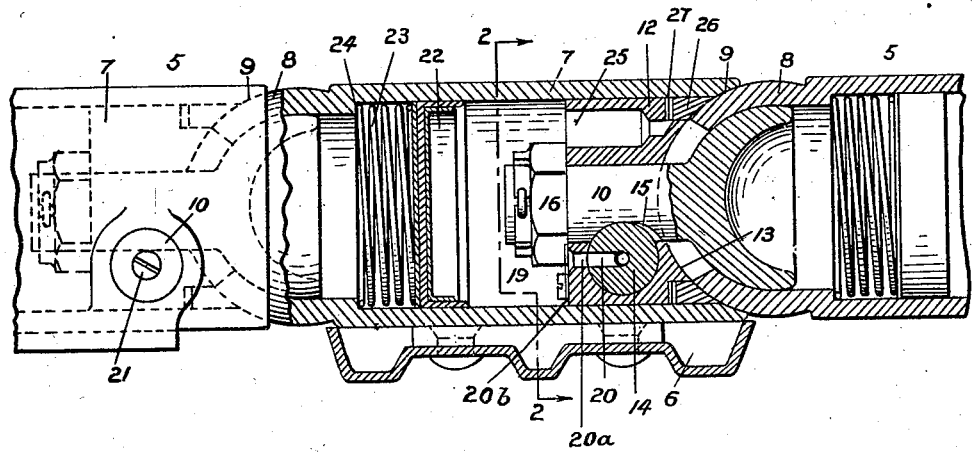
Fig. 1 is a longitudinal sectional view taken through adjacent link sections of a track constructed in accordance with the invention and showing the spring actuated diaphragm partially retracted.
Figure 2:
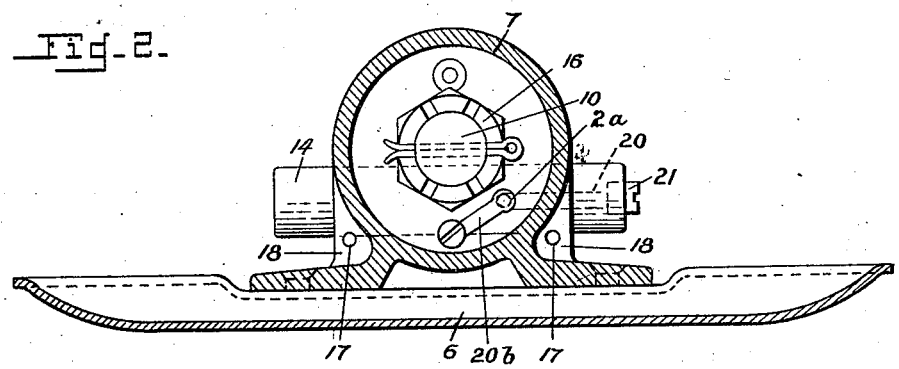
Fig. 2 is a sectional view on the line 2—2 of Fig. 1.

Referring to the drawing by numerals of reference:

According to the invention the endless track consists of identical link sections 5, each section comprising a shoe or grouser 6 to the inner side of which is secured a tubular member 7 constituting the rail or track way for the supporting rollers of the vehicle.

One end of the tube 7 is contracted as at 8 to present a hemi-spherical surface co-acting with a surface of similar curvature formed in the other end 9 of an adjacent tube and also with the connecting means carried by said adjacent tube.

The connecting means consist of a bolt 10 having a hemi-spherical head 11, disposed within the contracted end 8 of the tube and passed through a cylindrical block 12 which is formed with a concave face 13 in prolongation of the curvature of the end 9 whereby to complete the universal joint between adjacent link sections. The bolt and block are retained in place by means of a driving pin 14 which passes transversely through the tube and block and fits in a groove 15 on the bolt. The groove 15 is of greater breadth than the portion of the bolt disposed therein so as to provide for longitudinal adjustment of the bolt by means of the castellated nut 16 when the bearing surfaces of the joint have become worn. The driving pin 14 is secured by removable pins 17 engaging therewith and conveniently inserted through apertures in webs 18 on either side of the tube 7.

Lubricant for filling the chamber 19 may be introduced through passages 20 in the driving pin for which a screw plug 21 is provided and through a passage 20$^a$ in the block for which a spring valve 20$^b$ is provided. Within the chamber 19 is a diaphragm 22 movable to maintain the lubricant under pressure through a spring 23 abutting against a shoulder 24 in the tube 7. The lubricant passes to the universal joint through an aperture 25 in the block 12 and serves to prevent the incursion of foreign substances.

For the purpose of preserving the tightness of the joint there is provided a packing ring 26 which is held by a spring 27 in close contact with the external portion of the contracted end 8.

In assembling the track, the bolt is placed in position in the tube, and the packing ring, block, and nut are added to the projecting shank of the bolt. This unit is then inserted in the full size end 9 of another tube whence the assembly may be completed by means of the transversely disposed driving pin 14.

Figure 3:
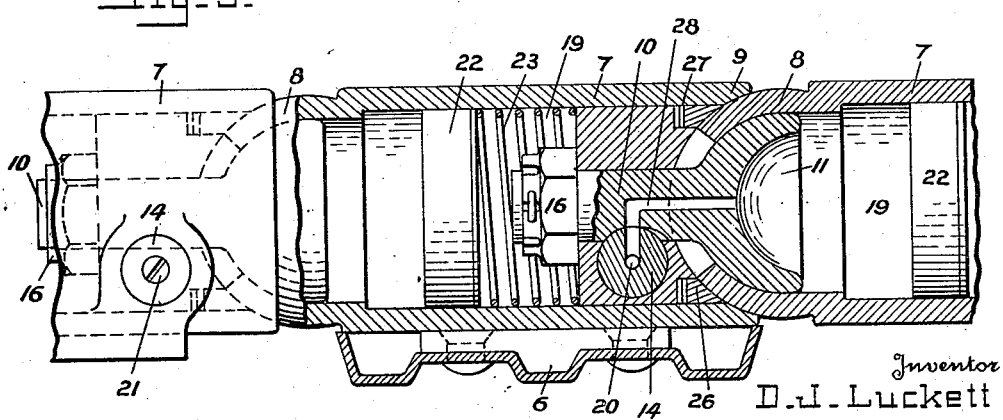
Fig. 3 is a view similar to Fig. 1 in which the diaphragm is reversed and partially retracted.

It is obvious that pressure may be exerted in the opposite direction, that is, against the spherical head of the bolt as illustrated in Figure 3. When arranged in this manner the lubricant would be passed through an axial passage 28 in the bolt, the spring 23 being seated against the block 12.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. An endless track embodying tubular links having coacting spherical surfaces at their adjacent ends, a block having a spherical face in each link, a packing ring interposed between the block and adjacent link, a bolt passing through the block, said bolt provided with a groove and having a hemispherical head disposed within the adjacent link, a driving pin passing transversely through each link and block and engaging in the groove of the bolt, said pin having a passage for admission of lubricant into the link, means for moving the bolt longitudinally to adjust for wear, a diaphragm in the link, and a spring for moving the diaphragm to maintain the lubricant under pressure.

2. An endless track embodying tubular links having coacting curved surfaces at their adjacent ends, a block having a curved face in each link, a bolt passing through the block, said bolt provided with a groove and having a curved head disposed within the adjacent link, a driving pin passing transversely through each link and block and engaging in the groove of the bolt, said pin having a passage for admission of lubricant into the link, a diaphragm in the link, and a spring for moving the diaphragm to maintain the lubricant under pressure.

3. An endless track embodying tubular links having coacting curved surfaces, means for universally connecting the links, a driving pin passing transversely through each link and connecting means for retaining said means within the link, said pin having a passage for admission of lubricant into the link, a diaphragm in the link, and a spring for moving the diaphragm to maintain the lubricant under pressure.

4. An endless track embodying tubular links having coacting curved surfaces, means for universally connecting the links, a driving pin passing transversely through each link and connecting means for retaining said means within the link, said pin having a passage for admission of lubricant, and means for maintaining the lubricant under pressure.

5. An endless track embodying tubular links having coacting curved surfaces, means for universally connecting the links, a driving pin passing transversely through each link and connecting means for retaining said means, and means for maintaining a lubricant under pressure within each link.

6. An endless track embodying links, adjustable means for universally connecting the links, and a driving pin passing transversely through each link and connecting means for retaining said means in place.

7. An endless track embodying links, means for universally connecting the links, and a driving pin passing transversely through each link and connecting means for retaining said means in place.

DINWIDDIE J. LUCKETT.